(12) United States Patent
Valentian

(10) Patent No.: US 8,375,697 B2
(45) Date of Patent: *Feb. 19, 2013

(54) ELECTROLYTIC IGNITER FOR ROCKET ENGINES USING LIQUID PROPELLANTS

(75) Inventor: Dominique Valentian, Rosny sur Seine (FR)

(73) Assignee: Snecma, Paris (FR)

( * ) Notice: Subject to any disclaimer, the term of this patent is extended or adjusted under 35 U.S.C. 154(b) by 676 days.

This patent is subject to a terminal disclaimer.

(21) Appl. No.: 12/593,755

(22) PCT Filed: Mar. 28, 2008

(86) PCT No.: PCT/FR2008/050541
§ 371 (c)(1),
(2), (4) Date: Sep. 29, 2009

(87) PCT Pub. No.: WO2008/135693
PCT Pub. Date: Nov. 13, 2008

(65) Prior Publication Data
US 2010/0107602 A1   May 6, 2010

(30) Foreign Application Priority Data

Mar. 30, 2007 (FR) ..................... 07 54171

(51) Int. Cl.
*F02C 7/264* (2006.01)
(52) U.S. Cl. .......... 60/39.826; 60/257
(58) Field of Classification Search ........... 60/39.821, 60/39.826, 200.1, 202, 212, 213, 257, 258; 219/121.48, 121.5, 121.51, 121.52; 315/111.31
See application file for complete search history.

(56) References Cited

U.S. PATENT DOCUMENTS

| | | | |
|---|---|---|---|
| 3,085,393 A * | 4/1963 | Hamlin, Jr. | 60/211 |
| 3,520,137 A | 7/1970 | Newman et al. | |
| 3,651,644 A | 3/1972 | Breen et al. | |
| 3,861,137 A * | 1/1975 | Russell et al. | 60/39.826 |
| 4,821,509 A | 4/1989 | Burton et al. | |
| 5,425,231 A * | 6/1995 | Burton | 60/203.1 |
| 6,084,198 A | 7/2000 | Birx | |
| 6,469,424 B1 * | 10/2002 | Marable | 313/120 |
| 8,122,703 B2 * | 2/2012 | Fisher | 60/258 |
| 2008/0264372 A1 * | 10/2008 | Sisk et al. | 123/144 |

FOREIGN PATENT DOCUMENTS

| | | |
|---|---|---|
| JP | 63208654 | 8/1988 |
| JP | 6088549 | 3/1994 |

* cited by examiner

*Primary Examiner* — Phutthiwat Wongwian
(74) *Attorney, Agent, or Firm* — Preti Flaherty Beliveau & Pachios LLP

(57) ABSTRACT

The electrolytic ignitor comprises an injector constituting a first electrode and including a fuel injector device, an oxidizer injector device, and an electrolyte injector device. A second electrode electrically insulated from the injector extends downstream beyond the injector. An electrolyte distribution channel for delivering electrolyte in the form of free jets through the electrolyte injector device comprises at least one injection hole in the vicinity of the fuel injector device and the oxidizer injector device. An electrical power supply circuit is adapted to raise the second electrode to a potential in the range 50 V to 1000 V relative to the potential of the first electrode. The electrolyte injected through the injection hole is capable of causing ignition of a gaseous mixture in a combustion chamber of an ignitor torch suitable for incorporating in a main injector of a rocket engine.

33 Claims, 7 Drawing Sheets

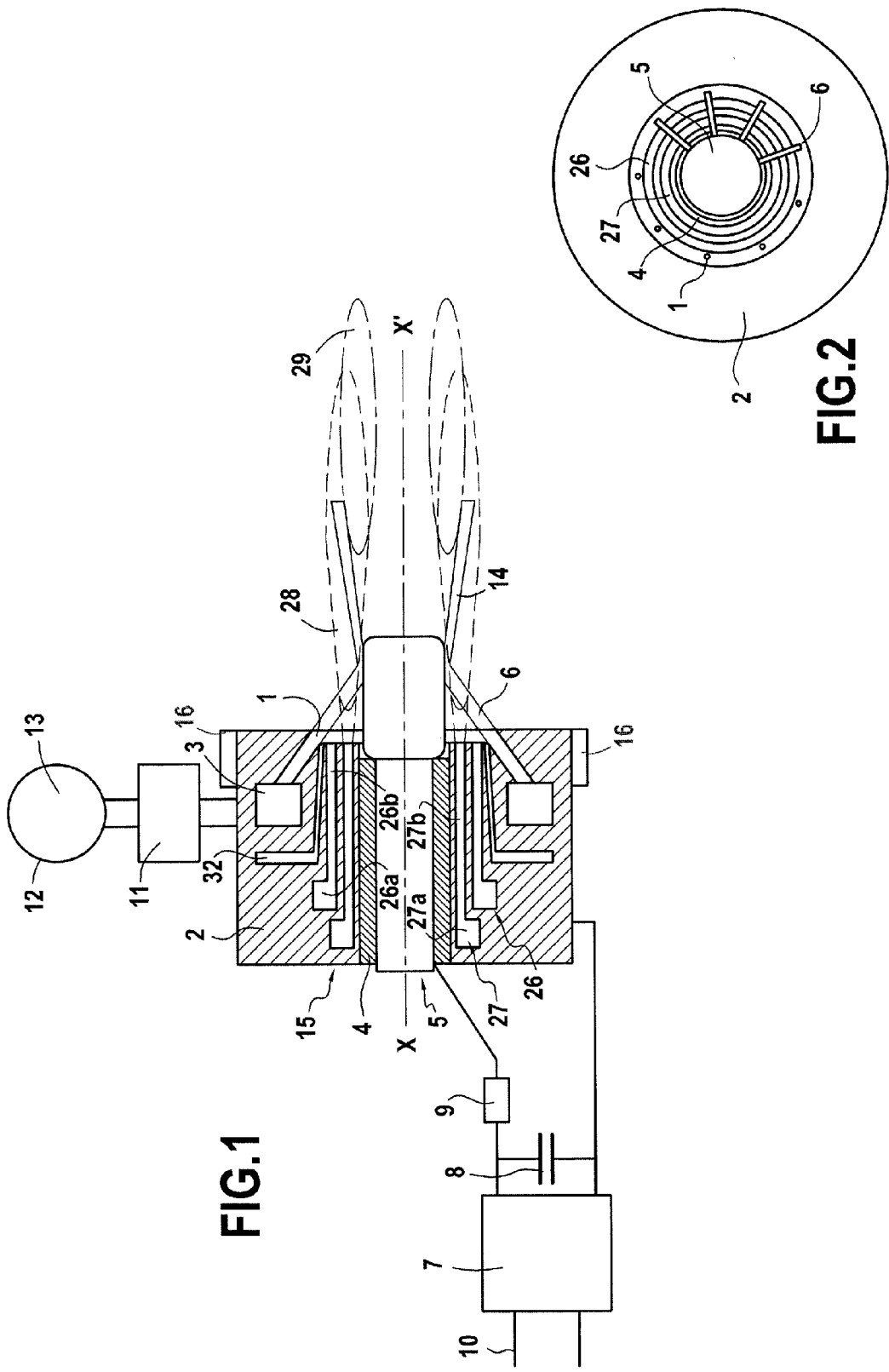

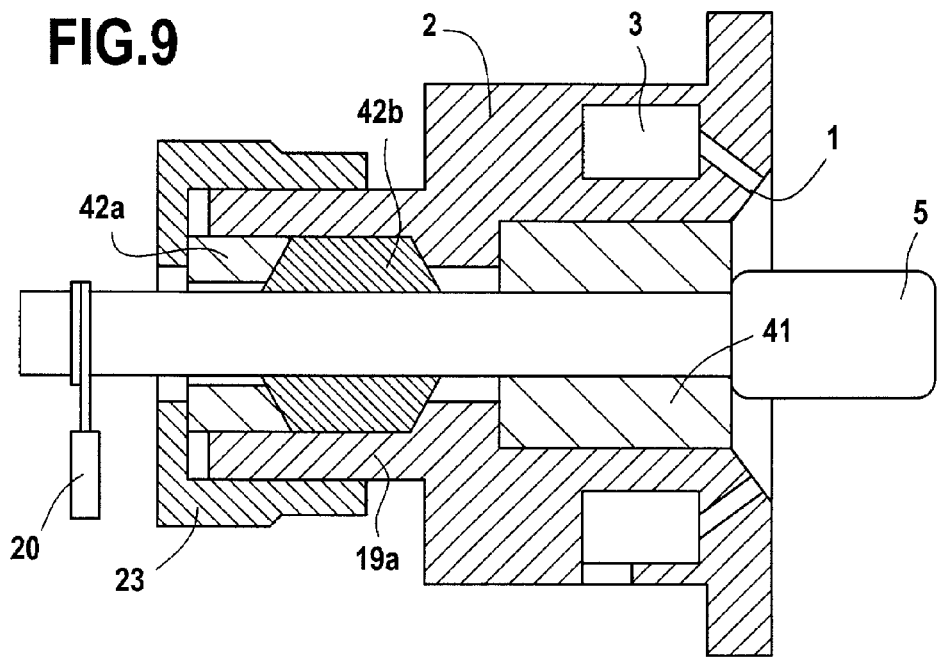
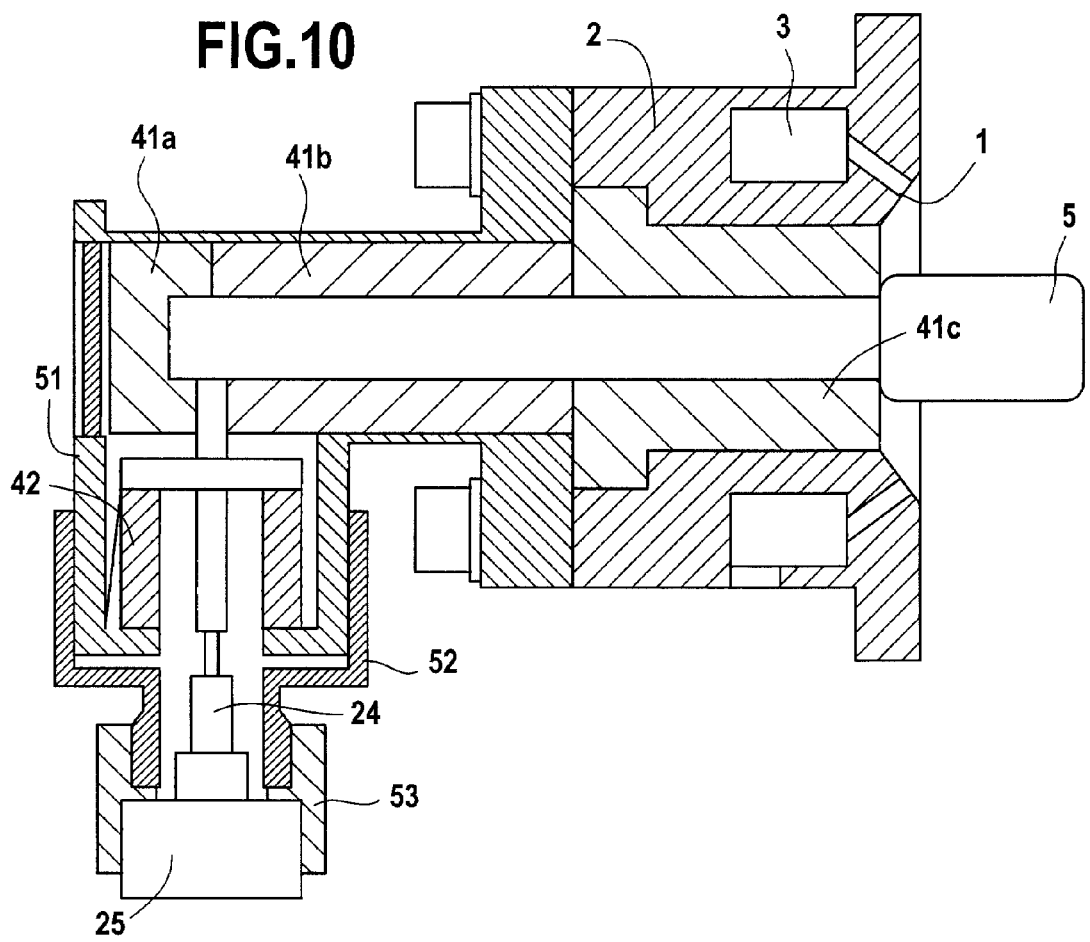

ELECTROLYTIC IGNITER FOR ROCKET ENGINES USING LIQUID PROPELLANTS

FIELD OF THE INVENTION

The present invention relates to an electrolytic ignitor for a rocket engine using liquid propellants, in particular cryogenic propellants.

The invention thus relates more particularly to a torch ignitor for a cryogenic engine and to an ignition torch suitable for incorporating in a main injector of a liquid-propellant rocket engine.

PRIOR ART

Rocket engines fed with liquid propellants are generally ignited by self-ignition or by pyrotechnic ignition, or by electrical ignition using a torch.

Self-ignition makes use of self-igniting propellants such as mono-methyl hydrazine (MMH) and nitrogen peroxide ($N_2O_4$), which are well known, but which present high levels of toxicity and provide a specific impulse that is limited in practice to 330 seconds.

Some rocket engines operating on liquid oxygen and hydrocarbon are ignited by injecting a self-igniting liquid together with liquid oxygen, e.g. using an organometallic compound (as is done in the RD-180 engine from the Russian supplier NPO Energomash).

Nevertheless, self-ignition leads to an additional complication. Certain liquids that self-ignite with oxygen, such as organometallic compounds, are spontaneously combustible in air, toxic, and cause burns by contact. They therefore present safety problems.

Propellant combinations that are not self-igniting, e.g. liquid oxygen and liquid hydrogen, or liquid oxygen and hydrocarbon, are generally ignited either by a pyrotechnic charge (Vulcain and HM 7 engines), or else by a torch (Vinci engine). An electric ignitor (spark plug) is also used with certain cryogenic engines. Torch ignitors generally include an ignition spark plug. In both circumstances, the high voltage used (10 kilovolts (kV) to 20 kV) can give rise to difficulties. A torch or spark plug ignitor presents a decisive advantage over pyrotechnic ignition: the number of ignitions is practically unlimited.

A fourth solution, catalytic ignition, is used with mono-propellants that present exothermic decomposition (hydrazine, hydrogen peroxide) or with gaseous mixtures (oxygen and hydrogen). Hydrazine is a mono-propellant that decomposes catalytically and that also presents a high level of toxicity. This solution appears not to be used in operational manner for igniting cryogenic rocket engines.

Torch ignitors for cryogenic engines are generally fed with gaseous hydrogen and oxygen. The spark plug needs to be suitably positioned to produce the spark in a zone where the gas mixture is capable of igniting, but not too close to the reactive zone, so as to be able to survive the torch flame.

The same problem arises with thrusters of smaller size, which are ignited directly by a spark plug. This applies to attitude control thrusters using liquid oxygen and fuel. Thrusters of this type are used on the Buran shuttle.

The spark plug, generally on the axis of the injector, must not project too far into the combustion chamber.

To overcome this problem, and while testing on the ground, it is possible to use light from a laser that is focused within the reactive gas mixture. The resulting spark can be situated at the point that is the most favorable in the flow.

Nevertheless, that method is not easily transposed to an operational rocket engine, given the problems associated with on-board laser technology, with the ability of an optical fiber to withstand vibration, with the behavior of the window through which the laser beam enters the combustion chamber, and with the behavior of the focusing optics.

In the field of pulsed plasma thrusters, spark plug ignition is also used.

Nevertheless, there also exists another method that consists in rapidly heating the propellant electrolytically. One such method is described for example in French patent No. 1 598 903 relating to an electrothermal thruster and to its feed device.

FIG. 3 is a diagrammatic schematic for the electric circuit of such an electrolytically ignited plasma thruster.

A thyristor 190, or a power transistor, under the control of a control circuit 191 enables two coaxial electrodes 133 and 130 that are immersed in a propellant to be subjected to a voltage difference (the propellant specifically being constituted by glycerin that is made conductive by adding sodium iodide). Under the effect of the voltage imposed by a capacitor 108, the Joule effect heating of the electrolytic solution leads rapidly to boiling (in less than one millisecond), and then to the formation of a plasma discharge in the channel surrounding the central electrode 133.

For a maximum current of 50 amps (A) and a voltage of 400 volts (V), the instantaneous power can reach 20 kilowatts (kW) for 10 milligrams (mg) of material.

In order to achieve enthalpy of 1 megajoule per kilogram (MJ/kg), where the propellant has already vaporized, a duration of 50 microseconds (is) suffices. That discharge in turn triggers the main discharge in an ionization chamber 125 surrounded by an insulating sheath 126 that is extended by a nozzle 127 that also constitutes the anode for the arc chamber. The instantaneous power reaches 1 megawatt (MW) and the energy (300 joules (J)) is sufficient to form a mean enthalpy of 30 MJ/kg.

A battery of main capacitors 181, 182, 183 and also the auxiliary capacitor 108 are charged by a single power supply circuit 107.

FIG. 4 is a detail view showing the central electrode 133 and the cathode 130 that together define an annular space 132 filled with liquid 131 by the capillary effect. The central electrode 133 is connected to a conductor 134 that is connected to the thyristor 190. The pre-discharged plasma penetrates into the discharge chamber 125.

Electrolytic ignition was also proposed in the 1970s to achieve hydrazine decomposition. U.S. Pat. No. 3,861,137 entitled "Mono-propellant electrolytic ignitor" describes a system using two porous electrodes and a ceramic felt constituting the insulation between the two electrodes. The inter-electrode voltage lies in the range 2 V to 30 V. Ignition results from the combination of heating, of ions being formed by electrolysis, and of the catalytic action of a non-conductive layer of ruthenium on the insulator. Decomposition continues on grids that are located downstream.

U.S. Pat. No. 3,651,644 entitled "Apparatus for initiating the decomposition of an exothermic propellant" describes a system of coaxial walls extending over the entire length of a combustion chamber. The mono-propellant used is mainly hydrazine. The inter-electrode voltage is of the order of 28 V. No provision is made for enabling electrolysis to initiate a discharge. A thermal bed finishes off decomposition.

In both of those two patents, the aim is to increase the area/thickness ratio since the resistivity of hydrazine is high.

A more recent article ("Characterization and electrical ignition of ADN based liquid mono-propellants", by Anders Larsson, Niklas Wingborg, Mattias Elfberg, and Patrick Appelgren, May 2005, ISSN 1650.1942) describes an experimental device enabling electrolytic ignition to be obtained of a solution of ADN. The liquid is confined in a dielectric tube (D=9 millimeters (mm), L=25 mm). It is subjected to a voltage of 5000 V delivered by a battery of capacitors. Ignition is obtained in a few milliseconds. The high voltage is made necessary by the length/section ratio of the liquid column.

U.S. Pat. No. 6,084,198 discloses a device for triggering discharge of a magneto-plasma dynamic (MPD) propellant that uses an auxiliary electrode in association with a low pressure trigger discharge gaseous medium.

OBJECT AND BRIEF SUMMARY OF THE INVENTION

The invention seeks to remedy the above-mentioned drawbacks and in particular to enable an ignitor to be made that presents greater flexibility in use than a pyrotechnic ignitor.

In particular, the invention seeks to make it possible to perform multiple ignitions as are absolutely necessary in at least the following circumstances:
a re-ignitable top stage;
attitude control for satellites, launchers, or planetary landers, making use of non-toxic propellants such as oxygen or ethyl alcohol;
landing with retrorockets operating in pulsed mode for a planetary mission (main propulsion using non-toxic propellants).

The invention also seeks to provide a high degree of flexibility in the use of an ignitor on a main stage of a launcher, in particular in the event of an aborted launch, such that no intervention on the ignitor is needed before attempting the following launch, thereby saving time that may amount to several days.

The invention also seeks to enable the ignitor device to be such that the thruster does not need to be subjected to any modification between reception testing and launch.

The invention also seeks to propose an ignitor of simplified construction and that, in particular, does not raise safety problems, does not require the use of a laser beam, and provides reliable ignition for a combustion chamber regardless of its size, with a very high level of instantaneous power being delivered.

In accordance with the invention, these objects are achieved by an ignitor torch suitable for incorporation in a main injector of a liquid-propellant rocket engine, the torch comprising a combustion chamber and an electrolytic ignitor, which electrolytic ignitor comprises a first electrode, a second electrode that is electrically insulated from the first electrode by an insulator, an injector, an electrolyte tank, and an electrolyte distribution channel, the torch being characterized in that the injector constitutes the first electrode and includes a fuel injector device, an oxidizer injector device, and an electrolyte injector device, in that the second electrode extends downstream beyond the injector, in that the electrolytic ignitor comprises an electrical power supply circuit adapted to raise the second electrode to a potential lying in the range 50 V to 1000 V relative to the potential of the first electrode, and in that the electrolyte distribution channel opens out via at least one injection hole situated in the vicinity of the outlet from the fuel injector device and the oxidizer injector device in such a manner that the electrolyte injected via said injection hole constitutes a free jet that strikes the second electrode in a zone that is situated outside the body of the injector constituted by the first electrode, such that electrolysis and ignition of the gaseous mixture take place downstream from the injector within the combustion chamber of the torch.

Preferably, the electrical power supply circuit is adapted to raise the second electrode to a potential lying in the range 100 V to 500 V relative to the potential of the first electrode constituted by the injector.

In the present invention, the spark plug of an ignitor torch is replaced by an electrolytic discharge ignitor device.

In the invention, the electrolyte present in the tank may be constituted by a composition that is different from the fuel delivered by the fuel injector device and from the oxidizer delivered by the oxidizer injector device.

Furthermore, in the invention, the electric discharge that produces ignition of the propellants in the torch is situated downstream from the injector and not inside it.

The electrolytic liquid is constituted by a solvent such as water, alcohol, or an ionic liquid having low vapor pressure, by a salt that provides ionic conduction on being dissociated ionically such as an ammonium salt for example, and optionally by an additive such as a fuel, for example, if the salt is an oxidizer or is surface active.

The salt may be chemically inert such as sodium iodide, or it may be reactive such as a nitrate.

The ignition process takes place as follows: one or more jets of liquid from the injector constituting a first electrode strike the second electrode situated at a potential of several hundred volts relative to the potential of the injector. That induces a high density of current in the electrolyte and leads to its heating rapidly and then possibly to an electric arc being formed.

The jet(s) of liquid electrolyte is/are situated downstream from the injector of the torch that produces the gaseous mixture that is to be ignited, which gaseous mixture may comprise a fuel, such as hydrogen or methane, and an oxidizer, such as oxygen.

Ignition may be produced in one or more of the following ways:
by an electric arc being formed by electric breakdown in the vapor stream;
within the mass of liquid, by an increase in its temperature leading to spontaneous decomposition (liquid monopropellant); and
with a liquid fuel, by spontaneous ignition of the hot vapor in oxygen.

The invention reproduces substantially all of the advantages of laser ignition and in particular the fact of it being possible for the ignition zone to be situated at a distance from solid walls, without suffering the above-mentioned drawbacks associated with the fragilities and the complexities of using a device for producing and applying a laser beam.

In a possible embodiment, the second electrode is placed centrally, and a plurality of electrolyte injection holes and the outlets from the fuel injector device and from the oxidizer injector device are disposed around the central electrode.

In another possible embodiment, the second electrode is disposed laterally and off-center relative to the electrolyte injection hole and to the outlets from the fuel injector device and from the oxidizer injector device.

The second electrode may be made of a refractory metal of the tungsten or tungsten/rhenium type.

In an advantageous embodiment, the fuel injector device and the oxidizer injector device include orifices distributed in a ring around a predetermined axis of the ignitor and a plurality of electrolyte injection holes are distributed in a ring around said predetermined axis, presenting angular positions that are offset relative to said orifices distributed in a ring.

The ignitor may comprise an electrical heater device and passive thermal insulation in order to maintain the temperature of the injector above the freezing point of the electrolyte.

The electrical power supply circuit may comprise a direct current (DC) electrical power source, at least one capacitor, and a switch such as a power transistor or a thyristor. Under such circumstances, the injector constituting the first electrode advantageously presents a potential close to electrical ground.

The capacitor and the switch may be housed in a housing that is secured to the body of the ignitor.

In a variant embodiment, the electrical power supply circuit comprises a DC power source, at least one capacitor, a chopper circuit, and a voltage-raising transformer with its primary and secondary being electrically isolated from each other, the primary being connected to the chopper circuit and the secondary being connected between the second electrode and the injector constituting the first electrode.

According to a particular characteristic of the invention, the insulator comprises a first insulator portion mounted to be able to expand freely, and a second insulator portion providing sealing between the second electrode and an insulator support.

Under such circumstances, the first insulator portion comprises at least one ceramic block made of boron nitride or of alumina.

In a particular embodiment, the second insulator portion is made of alumina and is brazed firstly to the second electrode and secondly to the insulator support.

In another particular embodiment, the second insulator portion may also be combined with a coaxial cable socket suitable for receiving a coaxial cable connector.

In a variant embodiment, the second insulator portion is made of a flexible material comprising one of the following materials: PTFE, PTFCE, Vespel, and fiberglass-filled PTFE, and the second insulator portion is mounted in packing mounted on the insulator support.

BRIEF DESCRIPTION OF THE DRAWINGS

Other characteristics and advantages of the invention appear from the following description of particular embodiments, given as examples and with reference to the accompanying drawings, in which:

FIG. 1 is a diagrammatic axial section view of an electrolytic ignition head with a central anode in a first embodiment of the invention;

FIG. 2 is an end view of the electrolytic ignition head of FIG. 1;

FIG. 9 is a diagrammatic axial section view showing a variant embodiment of an electrolytic ignition head of the invention with an insulator associated with packing;

FIG. 10 is a diagrammatic axial section view of a variant embodiment of an electrolytic ignition head of the invention with an angled hermetic outlet;

DETAILED DESCRIPTION OF PARTICULAR EMBODIMENTS OF THE INVENTION

Figure 3:
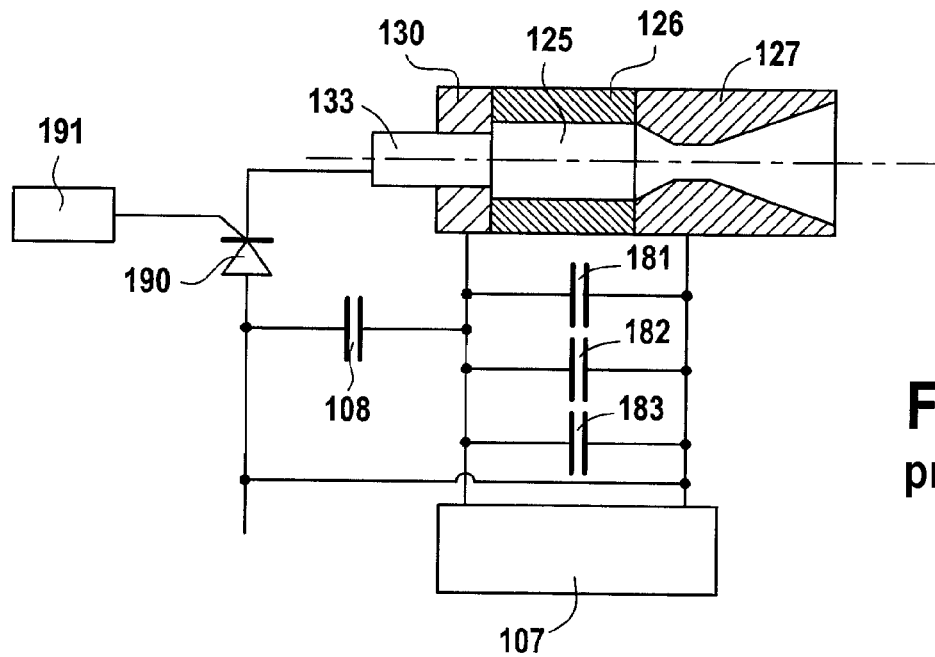
FIG. 3 is a diagrammatic view of the electric circuit of a prior art plasma thruster with electrolytic priming.
Figure 4:
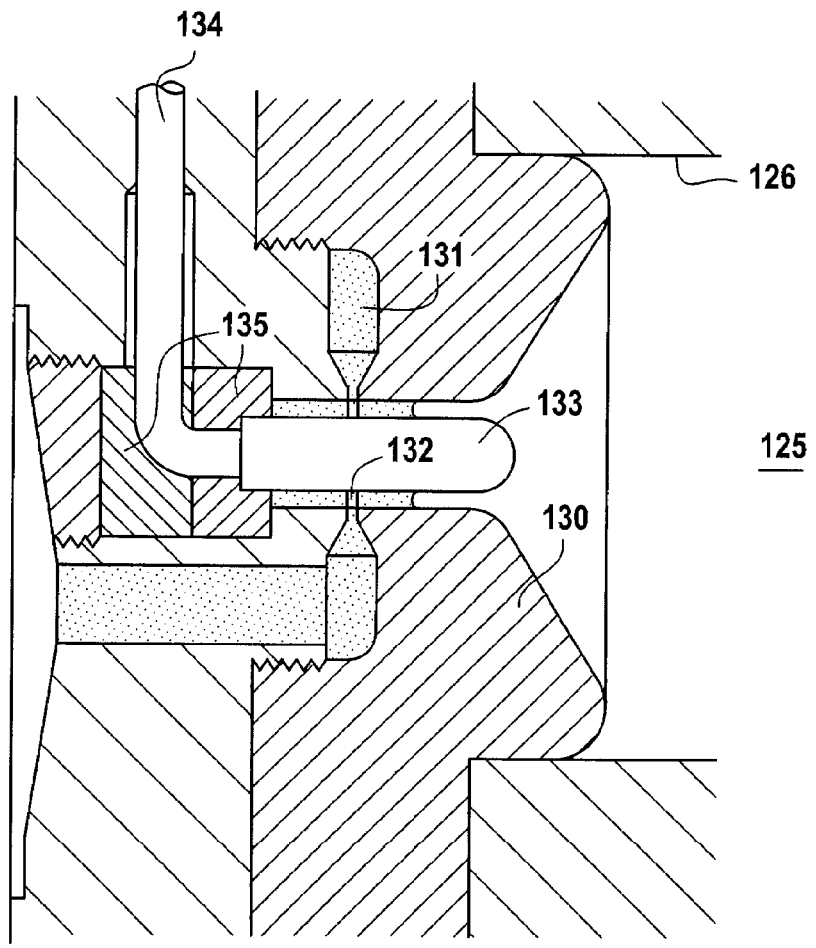
FIG. 4 is an axial section view of an example of a pre-discharge chamber in a prior art electrothermal thruster.

With reference to FIG. 1, there can be seen a first example of an electrolytic ignitor of the invention designed to be incorporated in a torch associated with a main injector that is to be mounted in a combustion chamber of a liquid-propellant rocket engine.

The electrolytic ignitor comprises an injector that, in the example described, presents a potential close to electrical ground and constitutes a cathode.

In conventional manner, the injector 2 comprises a fuel injector device 26 and an oxidizer injector device 27.

As can be seen in FIG. 2, the fuel injector device 26 and the oxidizer injector device 27 comprise respective distribution channels 26a, 27a and delivery orifices 26b, 27b distributed in a ring around the central axis XX' of the injector.

The injector 2 also includes an electrolytic injector device with an electrolyte distribution channel 3 associated with a plurality of injection holes 1 enabling free jets to be projected towards a central electrode 5 that is electrically insulated from the body of the injector 2 by an insulator 4.

In the example described, the central electrode 5 forms an anode that extends axially downstream beyond the injector 2.

The electrolyte dispenser 3 is fed via a solenoid valve 11 from a tank 12 containing an electrolyte 13 that is advantageously constituted by a compound that is different from the fuel delivered by the fuel injector device 26 and the oxidizer delivered by the oxidizer injector device 27.

In the embodiment of FIGS. 1 and 2, the electrolyte injection holes 1 are distributed in a ring around the axis XX', presenting angular positions that are offset relative to the orifices distributed in rings of the fuel injector device 26 and of the oxidizer injector device 27.

As can be seen in FIG. 1, channels 32 may be formed in the body of the injector 2 between the electrolyte distribution channel 3 and the fuel and oxidizer injector devices 26 and 27 so as to provide passive thermal insulation, thereby ensuring thermal decoupling. An electrical heater device 16, such as a resistor, may advantageously be placed on the injector 2 in the vicinity of the electrolyte distribution channel 3 so as to maintain the temperature of the injector 2 above the freezing point of the electrolyte while cooling down the cryogenic propellant rocket engine.

In the example of FIG. 1, an electrical power supply circuit is shown diagrammatically having a DC power source 7 taken from a busbar 10. The negative pole of the power source 7 is connected to the injector body 2, which thus constitutes a cathode. The positive pole of the power source 7 is connected via a switch 9 to the anode-forming central electrode 5.

A capacitor 8 is connected in parallel with the output of the power source 7 so as to enable a potential of a few hundred volts to be applied to the electrode 5. Discharging the capacitor 8 makes it possible to obtain a very high instantaneous level of power. By way of example, the switch 9 may be constituted by a power transistor or by a thyristor.

The solenoid valve 11 controls injection of the electrolyte jets. When this valve 11 is open, the electrolyte jets coming from the injection holes 1 put the anode-forming central electrode 5 into contact with the cathode-forming body of the injector 2.

The heating due to the electrolytic current causes an electric discharge to be formed that ignites the gas mixture 28 coming from the fuel and oxidizer injector devices 26 and 27 for the purpose of feeding the torch, which in the example shown is coaxial with the injector 2. In FIG. 1, reference 14 designates the flame precursors and reference 29 designates the flame of the torch.

FIG. 2 shows an injector 2 that, by way of example, has nine electrolyte injection holes 1. The number of injection holes is selected as a function of the flow rate to be delivered.

The left-hand portion of FIG. 2 shows the injector prior to an ignition sequence, and the right-hand portion of FIG. 2 shows the injector in operation with electrolyte jets.

It is important to observe that the electrolyte jets 6 coming from the injection holes 1 are situated downstream from the injector 2 that produces the gas mixture for ignition and they strike the electrode 5 in a zone that is situated outside the body of the injector 2.

The high current density in the electrolyte, the rapid heating of the electrolyte, and the possible formation of an electric arc thus take place within the torch downstream from the injector 2 and not inside the injector.

Unlike prior art devices, electrolysis takes place in the free jet and not in a confined space between two electrodes.

The electrical power supply at a relatively high voltage, lying in the range 50 V to 1000 V, or preferably in the range 100 V to 500 V, serves to avoid any breakdown in the vapor after the liquid has heated. Nevertheless, the voltage level remains low enough to avoid problems of electrical insulation.

The electrolytic liquid 13 is constituted by a solvent that may be constituted by water, alcohol, or an ionic liquid having vapor pressure, by a salt presenting ionic dissociation that provides ionic conduction, and possibly also by an additive (e.g. a fuel if the salt is an oxidizer or surface active).

The following can be mentioned as examples of electrolytic liquids suitable for the present invention:

water and ammonium chloride;
glycerol, sodium iodide, and a fluidizing additive;
isopropyl alcohol and ammonium nitrate; and
a fluorine-containing ionic liquid with low vapor pressure and ammonium nitrate.

By way of example, the ionic liquid may be selected from the following compounds: di-ethylammonium formate; and ethyl-methyl-imidazolium tetra-fluoroborate.

The electrolytic liquid may also be constituted by a non-toxic mono-propellant based on nitrate and comprising an aqueous solution of nitrates (e.g. hydroxyl ammonium nitrate (HAN), ammonium di-nitramide (ADN), or hydrazinium nitro-formate (HNF)) with an added water-soluble fuel such as an alcohol or triethanolammonium nitrate (TEAN).

Ignition of self-decomposition of a nitrate mono-propellant in ionic solution can be obtained by electrolytic heating.

Aqueous solutions of nitrates present high ionic conductivity "C" that increases with temperature T (see the document: "New nitrogen-based mono-propellants (HAN, ADN, HNF), physical chemistry of concentrated ionic aqueous solutions", by C. Kappenstein, N. Pillet, and A. Melchior).

This conductivity reaches 0.05 per ohm centimeter $(\Omega \cdot cm)^{-1}$ at $-12°$ C. and 70% concentration, and 0.2 $(\Omega \cdot cm)^{-1}$ at $+40°$ C. It follows a relationship of the following type:

$$\ln(C) = 1/(T-T_0)$$

The disposition with free jets 6 in accordance with the invention presents high resistance and makes it possible to operate at high voltage, of the order of several hundreds of volts. The heating takes place outside the injector. If the jet ignites before reaching the central electrode 5, the gas can expand freely in the combustion chamber.

When a film of vapor is produced on the central electrode 5 (the hottest part of the jet), current flow is interrupted and all of the voltage appears across the film. Since the product of pressure multiplied by distance is below the Paschen minimum, breakdown occurs and the spark ignites the remainder of the heated mixture.

The heating may give rise to selective evaporation (distillation) of the most volatile species, e.g. an alcohol. Alcohol vapor mixed with air facilitates ignition.

The example below gives an order of magnitude for the physical parameters of the discharge when using a multiple-jet injector:

| Individual jet: | |
|---|---|
| Diameter | 1 mm |
| Length: | 5 mm |
| Speed: | 3 meters per second (m/s) |
| Mass flow rate: | 3.3 grams per second (g/s) |
| Voltage: | $V_0$ = 500 V |

The temperature of the propellant is 298 K at the outlet from the injector.

The initial dissipated power is 600 watts (W) (resistance=410 ohms ($\Omega$)).

After 2 milliseconds (ms), the temperature profile of the jet begins to stabilize, with the downstream portion of the jet reaching 398 K (125° C.).

The dissipated power reaches 1560 W and the resistance of the jet is 160$\Omega$.

For an ignitor head having five orifices, the following figures apply:

| | |
|---|---|
| Initial power: | 3000 W |
| Power at 2 ms | 7800 W |
| Flow rate | 16.5 g/s |

By way of comparison, the thermal power delivered by exothermic decomposition of the mono-propellant at a flow rate of 16.5 g/s is greater than 50 kW.

The electrical power is supplied by the capacitor 8 which is capable of storing at least twice the energy that is dissipated in the discharge.

The electrolytic current reaches 15.6 A and this can be controlled by a switch 9 constituted by a power transistor.

The capacitor 8 is charged—preferably at constant current—via a voltage-raising DC/DC converter 7 connected to the busbar 10 of the satellite or missile having the rocket engine fitted with the electrolytic ignitor mounted thereon.

Injection of the mono-propellant is controlled by the solenoid valve 11, with voltage being applied simultaneously (no current will flow for about 5 ms to 10 ms, the response time of the valve).

Once ignition is obtained, the flow of current may be interrupted by closing the switch 9 constituted by a power transistor or a thyristor.

Interrupting the current causes the valve 11 to close and thus interrupts the liquid jet.

In a variant, the energy may be stored in a rapid-discharge storage battery.

In the invention, since ignition takes place in a liquid, it is relatively insensitive to pressure: the ignitor can operate equally well in a vacuum (boiling of the liquid is not immediate) and under pressure (atmospheric pressure at several megapascals (MPa)). It can also operate at simulated altitude (a few hundreds of pascals (Pa)).

In contrast, electric spark plug ignitors can be disturbed by an operating pressure that is not the vacuum of space or atmospheric pressure.

Operation at simulated altitude or in the upper atmosphere can lead to problems of insulation in the power supply and the cabling since the operating voltage is very high (10 kV to 20 kV).

Operation under high pressure becomes difficult: the insulating capability of the gas increases, thereby making ignition more complicated.

The electrolytic ignitor uses a modest voltage, of the order of 500 V, thereby simplifying problems of insulation, in particular in the pressure range corresponding to operating at simulated altitude.

The jet may be positioned in such a manner as to reach the zone where the richness of the mixture is the most likely to sustain combustion.

From this point of view, it presents advantages analogous to laser ignition, while being easier to implement.

Figure 12:
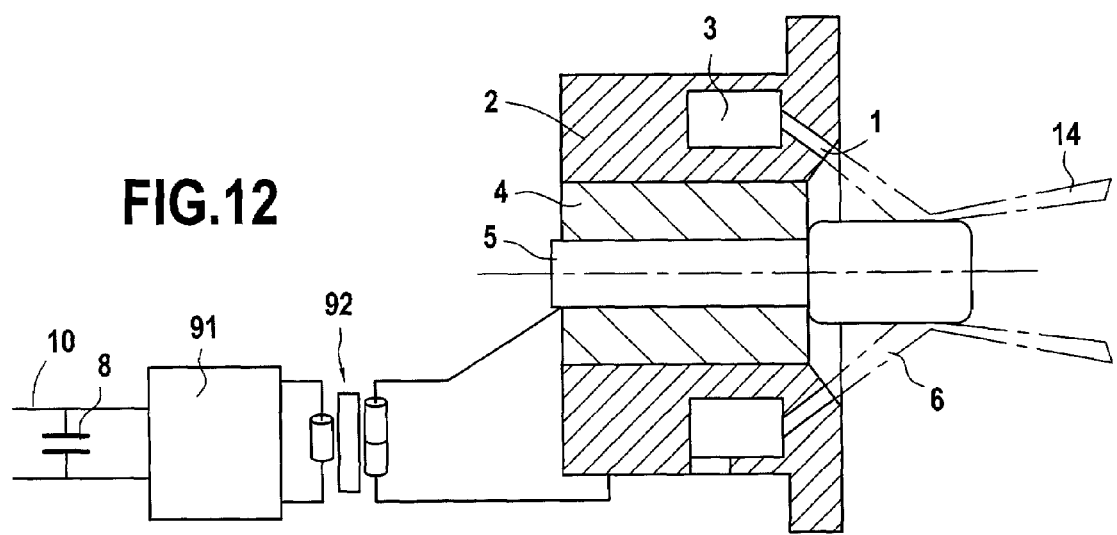
FIG. 12 is a diagrammatic view of an electrolytic ignition head of the invention with an electrical power supply circuit incorporating a voltage-raising transformer.

In FIG. 12, there can be seen a variant embodiment in which electrolysis is performed using alternating current.

Starting from a DC source such as the busbar 10 of the satellite or missile on which the rocket engine fitted with the electrolytic ignitor is placed, energy is stored in supercapacitors 8 or in a storage battery for powering a chopper circuit 91 constituted by power transistor (e.g. insulated-gate bipolar transistors (IGBTs)) capable of controlling a current of 100 A or more at a frequency lying in the range 10 kilohertz (kHz) to 100 kHz, and a voltage-raising transformer 92, preferably a ferrite transformer, having its secondary directly powering the electrolytic ignitor between the first electrode constituted by the body of the injector 2 and the second electrode constituted by the electrode 5.

Since the transformer 92 and the transistors of the circuit 91 operate for a short period only (a few tens of milliseconds), there is no need to provide a large amount of cooling.

An electrolytic ignitor having a central electrode 5 is described above with reference to FIGS. 1, 2, and 12.

Figure 5:
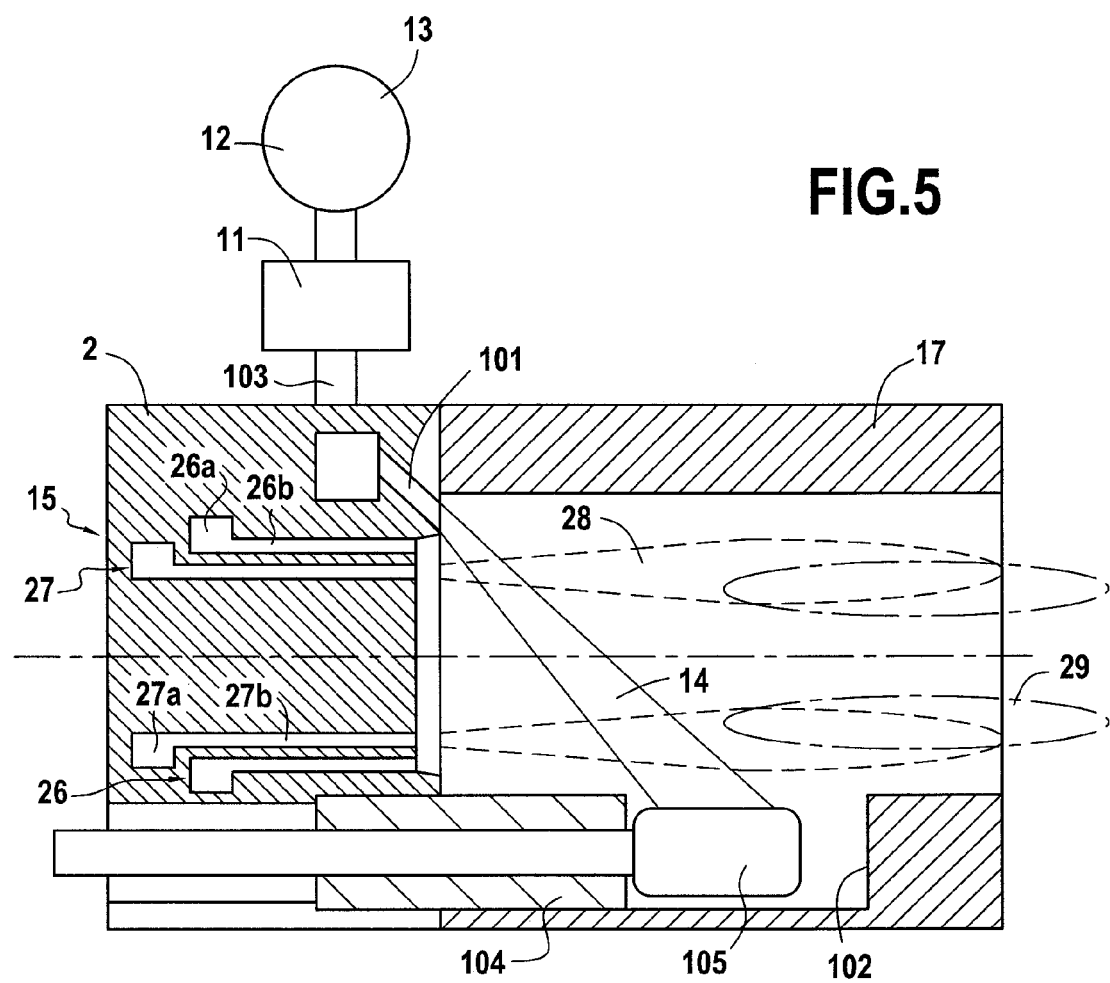
FIG. 5 is a diagrammatic axial section view of an electrolytic ignition head with an off-center lateral anode, constituting a second embodiment of the invention.
Figure 6:
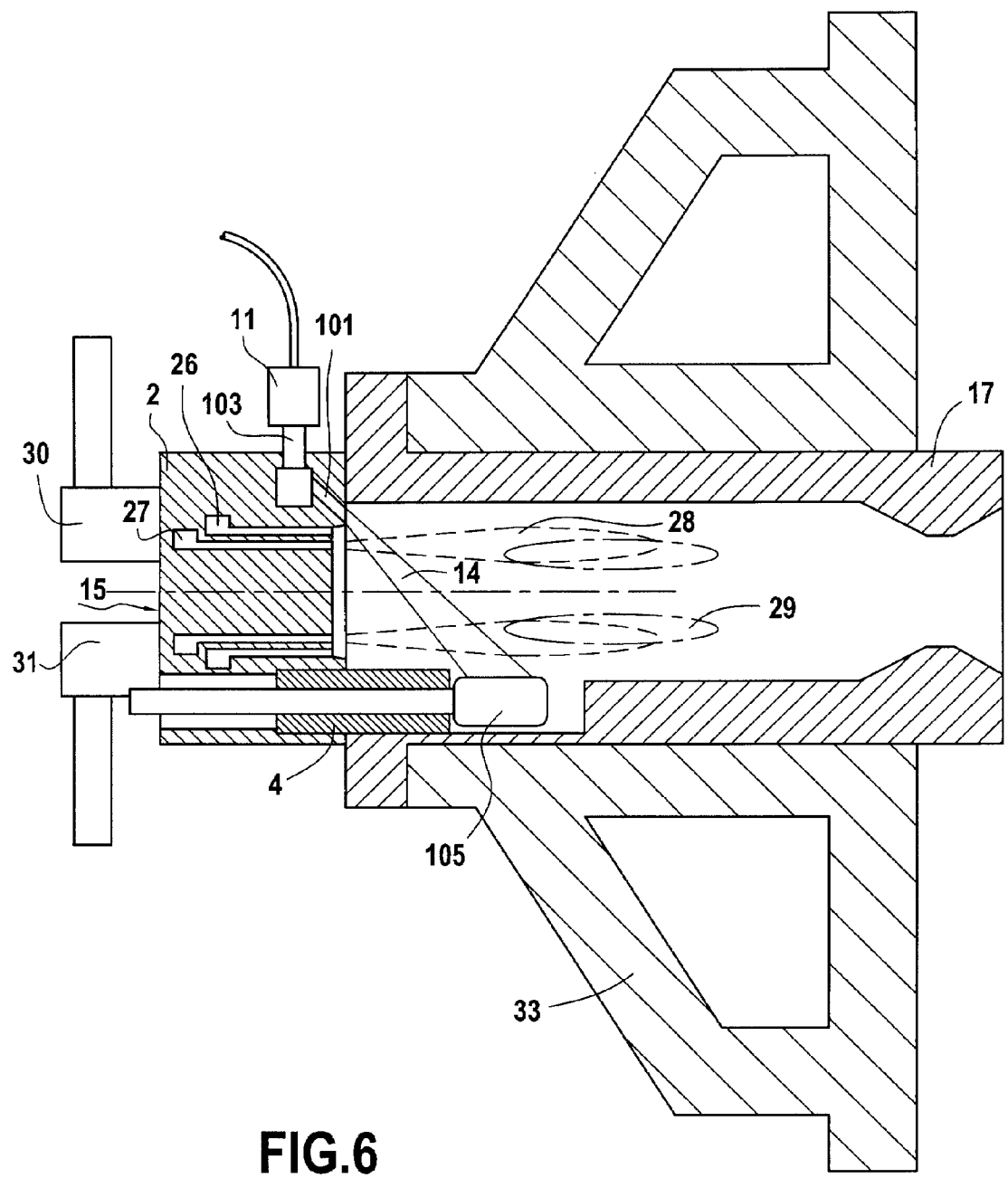
FIG. 6 is a diagrammatic axial section view showing the FIG. 5 ignition head incorporated in a torch and a main injector.

In another possible embodiment, shown in FIGS. 5 and 6, second electrode 105 (forming an anode when using a DC power supply) is no longer placed in a central position, but is situated laterally and off-center away from the longitudinal axis of the ignitor and the associated torch 17. Under such circumstances, the electrolyte distribution channel 103 is located on a first side of the ignitor (to the top of FIGS. 5 and 6), outside the fuel and oxidizer injector devices 26 and 27, while the electrode 105 is placed in a recess 102 formed in the opposite wall (to the bottom of FIGS. 5 and 6).

At least one injection hole 101 is formed from the distribution channel 103 in the body of the injector 2 so as to create at least one transverse jet 101 that strikes the electrode 105 and that presents the same properties as in the above-described embodiment, the electric circuit shown in FIG. 1 or FIG. 12 being suitable for being implemented in the same manner with the embodiment of FIGS. 5 and 6, and with the electrolytic liquid being likewise selected from the compositions mentioned above.

Thus, the dissipation of electrical power by ionic conduction in the electrolyte jet, e.g. in the range 100 watts per gram per second (W/g/s) to 1000 W/g/s gives rise to a sufficient rise in temperature, e.g. in the range 5000 degrees Celsius per second (° C./s) to 20,000° C./s to cause an electric breakdown of the electrolyte, or spontaneous decomposition thereof if the electrolyte is a mono-propellant, with the gaseous mixture 28 coming from the fuel and oxidizer injector devices 26 and 27 (which in the example shown are of the coaxial type) being ignited by the flame precursor or by the combustion gas 14 in the torch 17.

In FIG. 6, the electrolytic ignitor can be seen incorporated in the torch 17 fed with gaseous propellant by the fuel and oxidizer injector devices 26 and 27, themselves fed via solenoid valves 30 and 31.

The torch 17 is itself incorporated in the main injector 33 of the rocket engine and is situated on the axis thereof.

Figure 7:
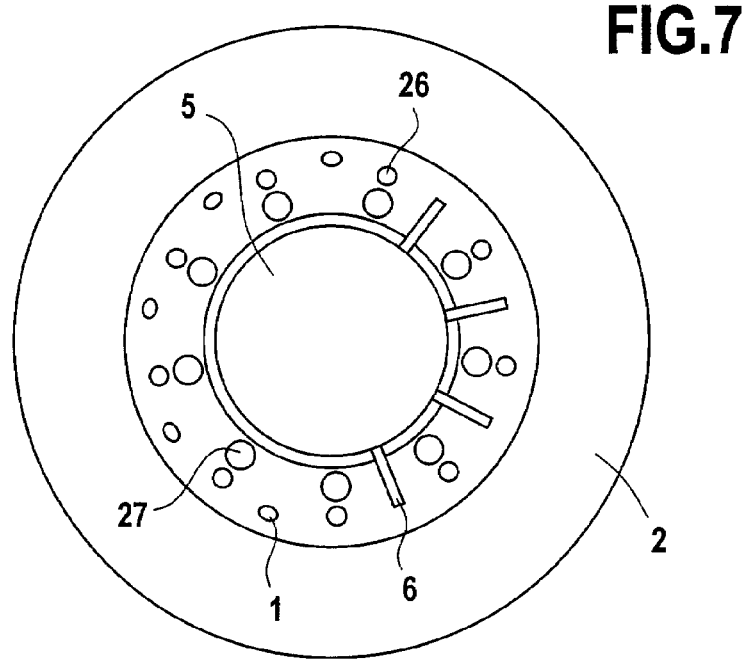
FIG. 7 is an end view of an electrolytic ignition head showing a variant embodiment of FIG. 2.

FIG. 7 shows a variant embodiment of an electrolytic ignitor with a central electrode 5. The fuel injector device 26 and the oxidizer injector device 27 comprise respective series of orifices constituting pairs that are angularly offset relative to the liquid jets coming from the electrolytic liquid injection holes 1, so as to limit the extent to which the gas jets blow into the liquid jets.

As in FIG. 2, FIG. 7 shows in its left-hand part the injector 2 prior to an injection sequence, and in its right-hand half it shows the injector 2 during an ignition sequence with the electrolyte jets 6.

FIGS. 8 to 11 show particular embodiments of the insulator that is interposed between the central electrode 5 forming the second electrode and the body of the injector 2 forming the first electrode. As in FIG. 12, for reasons of simplification, FIGS. 7 to 11 do not show the torch injector device 15 comprising the fuel injector device 26 and the oxidizer injector device 27.

Similarly, FIGS. 8 to 11 do not show the electrical power supply circuit, which may be analogous to those described with reference to FIGS. 1 and 12, nor does it show the elements associated with the electrolytic liquid dispenser 3 such as the solenoid valve 11, the tank 18, the electrical resistance 16, and the thermal decoupling 32 shown in FIG. 1.

Figure 8:
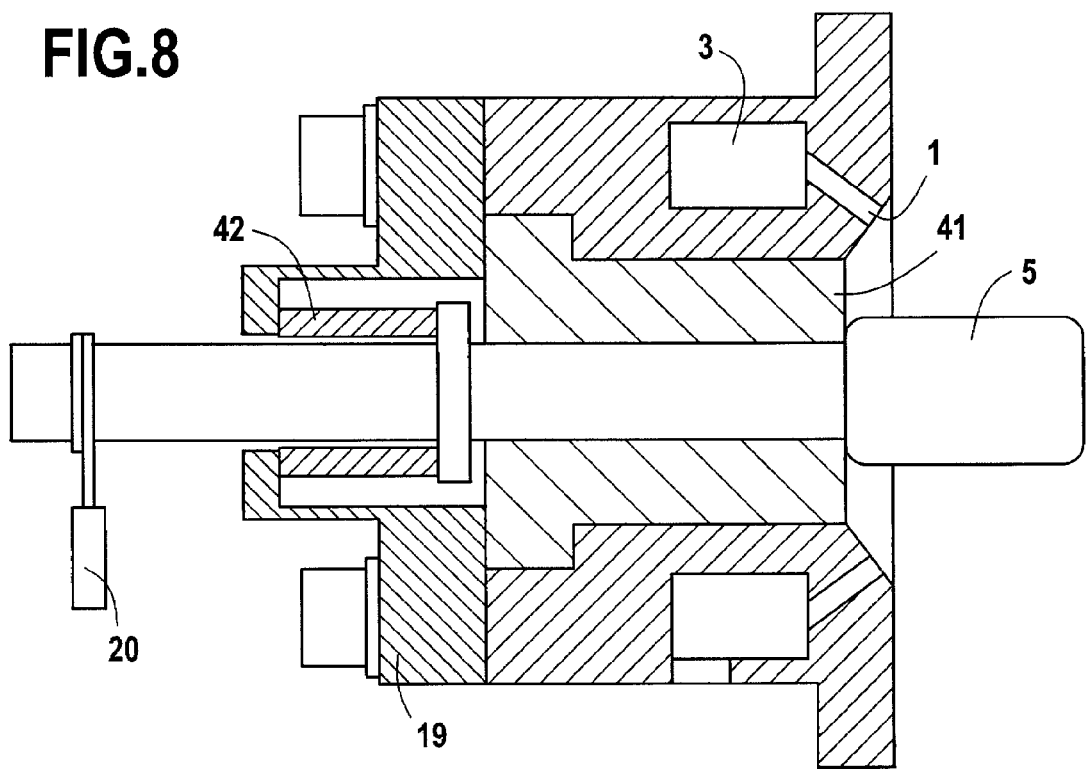
FIG. 8 is a diagrammatic axial section view of a variant embodiment of an electrolytic ignition head of the invention, with a two-part insulator.

FIG. 8 shows an electrical insulator made up of two portions. The downstream portion 41 situated facing the combustion chamber is a block of ceramic mounted with clearance so as to be free to expand. The upstream portion 42 provides sealing. It is brazed to the insulator support 19 and to the central electrode 5. The configuration enables the insulator 41, 42 to be subjected to compression (starting from an end effect and the pressure of combustion).

The downstream portion 41 may be made of boron nitride or of alumina, while the upstream portion 42 may be made of alumina.

In FIG. 8, reference 20 designates an electrical connection.

FIG. 9 shows an electrical insulator with packing.

The downstream portion 41 of the electrical insulator provides a fire-break wall and may be made in manner analogous to the downstream portion 41 of the FIG. 8 embodiment.

The central electrode 5 is sealed and held by packing made up of a flexible insulator 42b situated close to the downstream portion 41, an insulating thrust washer 42a, and a nut 23 that is tightened onto the rear portion 19a of the injector 2.

The flexible insulator 42b may be made of polytetrafluoroethylene (PTFE), polytrifluoro chloroethylene (PTFCE), or PTFE filled with fibers of glass or analogous material, such as for example the product sold by the supplier DuPont under the name Vespel®.

FIG. 10 shows an electrical insulator made up of a plurality of portions so as to present minimum bulk.

As shown in FIG. 10, the downstream portion of the insulator is itself subdivided into two or three portions 41a, 41b, and 41c. The upstream portion 42 of the insulator is made so as to present a bend. It may be installed and held in place by a metal shutter 51 that is screw-fastened or welded to the rear portion of the injector 2.

The electrical power supply cable 24 for the central electrode 5 may be connected to a coaxial cable 25 by a coupling element 53 associated with a socket 52 fitted on the metal shutter 51.

The embodiments of FIGS. 9 and 10 serve to minimize the electromagnetic interference caused by the discharge current.

Figure 11:
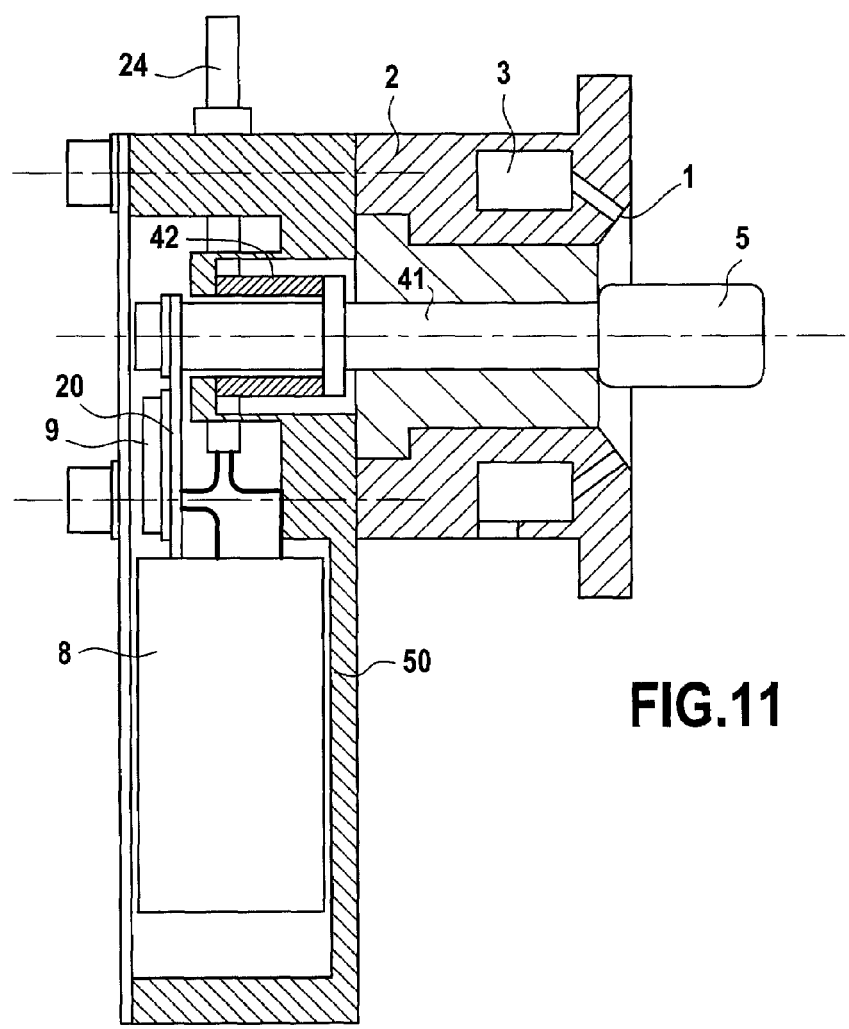
FIG. 11 is a diagrammatic axial section view of a variant embodiment of an electrolytic ignition head with an incorporated electrical power circuit.

FIG. 11 shows an example of an electrolytic ignitor with a power circuit incorporated in a housing 50 fitted to the body of the injector 2. The electrical insulator may be made of two portions 41 and 42 as in the embodiment of FIG. 8.

The capacitor 8 and the power transistor 9 forming the switch are incorporated in the housing 50.

The connection 20 with the central electrode 5 may be implemented in the form of a printed circuit supporting the power transistor 9. The electrical connections are thus constituted by no more than low-power cables 24 that are light in weight and that can accommodate small radii of curvature.

In the various embodiments described, the central electrode 5 or the off-center electrode 105, may be made of a refractory metal of the tungsten or tungsten/rhenium type.

The invention claimed is:

1. A torch suitable for incorporation in a main injector apparatus of a liquid-propellant rocket engine, the torch comprising a combustion chamber and an electrolytic ignitor, which electrolytic ignitor comprises a first electrode, a second electrode that is electrically insulated from the first electrode by an insulator, an injector, an electrolyte tank, and an electrolyte distribution channel, wherein said injector includes a fuel injector device, an oxidizer injector device, and an electrolyte injector device, wherein said injector constitutes said first electrode, wherein the second electrode extends downstream beyond the injector, wherein the electrolytic ignitor comprises an electrical power supply circuit adapted to raise the second electrode to a potential lying in a range of 50 V to 1000 V relative to a potential of the first electrode, and wherein the electrolyte distribution channel opens out via at least one injection hole situated in a vicinity of outlets of the fuel injector device and of the oxidizer injector device in such a manner that an electrolyte injected via the at least one injection hole constitutes a free jet that strikes the second electrode in a zone that is situated outside a body of the injector constituted by the first electrode, such that electrolysis and ignition of a gaseous mixture take place downstream from the injector within the combustion chamber of the torch.

2. A torch according to claim 1, wherein the second electrode is placed centrally, and wherein a plurality of said at least one injection hole and said outlets of the fuel injector device and of the oxidizer injector device are disposed around the central electrode.

3. A torch according to claim 1, wherein the second electrode is disposed laterally and off-center relative to the at least one injection hole and to said outlets of the fuel injector device and of the oxidizer injector device.

4. A torch according to claim 1, wherein the second electrode is made of a refractory metal including tungsten or tungsten/rhenium.

5. A torch according to claim 1, wherein an electrolyte present in the tank is constituted by a composition that is different from the fuel applied by the fuel injector device and from the oxidizer applied by the oxidizer injector device.

6. A torch according to claim 1, wherein an electrolyte present in the tank is constituted by an aqueous solution of a salt.

7. A torch according to claim 1, wherein an electrolyte present in the tank comprises an ionic liquid having low vapor pressure.

8. A torch according to claim 7, wherein the ionic liquid is constituted by one of the following compounds: di-ethylammonium formate; and ethyl-methyl-imidazolium tetra-fluoroborate.

9. A torch according to claim 1, wherein an electrolyte present in the tank comprises a mono-propellant based on nitrates in aqueous solution with a water-soluble fuel added thereto.

10. A torch according to claim 1, wherein the fuel injector device and the oxidizer injector device include orifices distributed in a ring around a predetermined axis of the electrolytic ignitor and wherein a plurality of said at least one injection hole is distributed around said predetermined axis, presenting angular positions that are offset relative to said orifices distributed in said ring.

11. A torch according to claim 1, wherein the torch includes an electrical heater device and passive thermal insulation in order to maintain a temperature of the injector above a freezing point of an electrolyte.

12. A torch according to claim 1, wherein the electrical power supply circuit comprises a DC power supply, at least one capacitor, and a switch, and wherein the injector constituting the first electrode presents a potential close to electrical ground.

13. A torch according to claim 12, wherein the switch comprises a power transistor or a thyristor.

14. A torch according to claim 12, wherein the at least one capacitor and the switch are housed in a housing secured to the body of the electrolytic ignitor.

15. A torch according to claim 1, wherein the electrical power supply circuit comprises a DC power source, at least one capacitor, a chopper circuit, and a voltage-raising transformer including a primary and a secondary being electrically isolated from each other, the primary being connected to the chopper circuit and the secondary being connected between the second electrode and the injector constituting the first electrode.

16. A torch according to claim 1, wherein the insulator comprises a first insulator portion mounted to be able to expand freely, and a second insulator portion providing sealing between the second electrode and an insulator support.

17. A torch according to claim 16, wherein the first insulator portion comprises at least one ceramic block made of boron nitride or of alumina.

18. A torch according to claim 16, wherein the second insulator portion is made of alumina and is brazed firstly to the second electrode and secondly to the insulator support.

19. A torch according to claim 16, wherein the second insulator portion is made of a flexible material comprising one of the following materials: polytetrafluoroethylene, polytrifluorochloroethylene, Vespel, and fiberglass-filled polytetrafluoroethylene.

20. A torch according to claim 16, wherein the second insulator portion is combined with a coaxial cable socket receiving a connector for a coaxial cable.

21. A torch according to claim 1, wherein the electrical power supply circuit is adapted to provide for the second electrode potential lying in a range 100 V to 500 V relative to a potential of the first electrode constituted by the injector.

22. A torch according to claim 1, wherein:
the second electrode is made of a refractory metal including tungsten or tungsten/rhenium;
the torch includes an electrical heater device and passive thermal insulation in order to maintain a temperature of the injector above a freezing point of an electrolyte;
the insulator comprises a first insulator portion mounted to be able to expand freely, and a second insulator portion providing sealing between the second electrode and an insulator support;
the first insulator portion comprises at least one ceramic block made of boron nitride or of alumina; and
the electrical power supply circuit is adapted to provide for the second electrode potential lying in a range 100 V to 500 V relative to the potential of the first electrode constituted by the injector.

23. A torch according to claim 22, wherein:
the second electrode is placed centrally, and wherein a plurality of said at least one injection hole and the outlets from the fuel injector device and from the oxidizer injector device are disposed around the central electrode; and
the fuel injector device and the oxidizer injector device include orifices distributed in a ring around a predetermined axis of the electrolytic ignitor and wherein a plurality of said at least one injection hole is distributed around said predetermined axis, presenting angular positions that are offset relative to said orifices distributed in said ring.

24. A torch according to claim 22, wherein
the second electrode is disposed laterally and off-center relative to the plurality of electrolyte injection holes and to the outlets from the fuel injector device and from the oxidizer injector device.

25. A torch according to claim 22, wherein an electrolyte present in the tank is constituted by a composition that is different from the fuel applied by the fuel injector device and from the oxidizer applied by the oxidizer injector device.

26. A torch according to claim 22, wherein an electrolyte present in the tank is constituted by an aqueous solution of a salt.

27. A torch according to claim 22, wherein:
an electrolyte present in the tank comprises an ionic liquid having low vapor pressure; and
the ionic liquid is constituted by one of the following compounds: di-ethylammonium formate; and ethyl-methyl-imidazolium tetra-fluoroborate.

28. A torch according to claim 22, wherein an electrolyte present in the tank comprises a mono-propellant based on nitrates in aqueous solution with a water-soluble fuel added thereto.

29. A torch according to claim 22, wherein:
the electrical power supply circuit comprises a DC power supply, at least one capacitor, and a switch, and wherein the injector constituting the first electrode presents a potential close to electrical ground;
the switch comprises a power transistor or a thyristor; and
the capacitor and the switch are housed in a housing secured to the body of the electrolytic ignitor.

30. A torch according to claim 22, wherein the electrical power supply circuit comprises a DC power source, at least one capacitor, a chopper circuit, and a voltage-raising transformer including a primary and a secondary being electrically isolated from each other, the primary being connected to the chopper circuit and the secondary being connected between the second electrode and the injector constituting the first electrode.

31. A torch according to claim 22, wherein the second insulator portion is made of alumina and is brazed firstly to the second electrode and secondly to the insulator support.

32. A torch according to claim 22, wherein the second insulator portion is made of a flexible material comprising one of the following materials: polytetrafluoroethylene, polytrifluorochloroethylene, Vespel, and fiberglass-filled polytetrafluoroethylene.

33. A torch according to claim 22, wherein the second insulator portion is combined with a coaxial cable socket receiving a connector for a coaxial cable.

* * * * *

UNITED STATES PATENT AND TRADEMARK OFFICE
CERTIFICATE OF CORRECTION

PATENT NO. : 8,375,697 B2  
APPLICATION NO. : 12/593755  
DATED : February 19, 2013  
INVENTOR(S) : Dominique Valentian Page 1 of 1

It is certified that error appears in the above-identified patent and that said Letters Patent is hereby corrected as shown below:

In the Specification

Column 2, line 31, "(is)" should read --(µs)--;

Signed and Sealed this  
Twenty-fourth Day of September, 2013

Teresa Stanek Rea  
*Deputy Director of the United States Patent and Trademark Office*